United States Patent
Liu

(10) Patent No.: US 11,012,258 B2
(45) Date of Patent: May 18, 2021

(54) PACKET TRANSMISSION

(71) Applicant: NEW H3C TECHNOLOGIES CO., LTD., Hangzhou (CN)

(72) Inventor: Jianfeng Liu, Beijing (CN)

(73) Assignee: New H3C Technologies Co., Lid., Hangzhou (CN)

( * ) Notice: Subject to any disclaimer, the term of this patent is extended or adjusted under 35 U.S.C. 154(b) by 323 days.

(21) Appl. No.: 16/097,078

(22) PCT Filed: Apr. 28, 2017

(86) PCT No.: PCT/CN2017/082369
§ 371 (c)(1),
(2) Date: Oct. 26, 2018

(87) PCT Pub. No.: WO2017/186159
PCT Pub. Date: Nov. 2, 2017

(65) Prior Publication Data
US 2020/0328914 A1    Oct. 15, 2020

(30) Foreign Application Priority Data
Apr. 29, 2016  (CN) .......................... 201610285556.9

(51) Int. Cl.
*H04L 12/28* (2006.01)
*H04L 12/46* (2006.01)
(Continued)

(52) U.S. Cl.
CPC ...... *H04L 12/4633* (2013.01); *H04L 12/4641* (2013.01); *H04L 45/745* (2013.01); *H04L 61/20* (2013.01); *H04L 61/6022* (2013.01)

(58) Field of Classification Search
None
See application file for complete search history.

(56) References Cited

U.S. PATENT DOCUMENTS 9,781,037 B2 *  10/2017  Nellikar .................. H04L 49/70
10,079,798 B2 *  9/2018  Du ............................ G06F 9/50
(Continued)

FOREIGN PATENT DOCUMENTS

CN        102970227 A        3/2013
CN        103095546 A        5/2013
(Continued)

OTHER PUBLICATIONS

State Intellectual Property Office of the People's Republic of China, Office Action and Search Report Issued in Application No. 201610285556.9, dated Jul. 29, 2019, 13 pages. (Submitted with Partial Translation).

(Continued)

*Primary Examiner* — Phyllis A Book
(74) *Attorney, Agent, or Firm* — McCoy Russell LLP

(57) ABSTRACT

An egress VTEP device of a data center receives a first packet sent by a local VTEP device of the data center, through an intra-domain VXLAN tunnel, and sends the first packet to an egress VTEP device on an opposite end of another data center through a corresponding inter-domain VXLAN tunnel. In addition, the egress VTEP device of the data center receives a second packet sent by the egress VTEP devices on an opposite end of another data center, through an inter-domain VXLAN tunnel, and sends the second packet to a local VTEP device of the data center through a corresponding intra-domain VXLAN tunnel.

10 Claims, 5 Drawing Sheets

(51) Int. Cl.
*H04L 12/741* (2013.01)
*H04L 29/12* (2006.01)

(56) References Cited

U.S. PATENT DOCUMENTS

| | | | | |
|---|---|---|---|---|
| 10,298,538 | B2* | 5/2019 | Yang | H04L 61/103 |
| 2014/0146817 | A1* | 5/2014 | Zhang | H04L 45/74 |
| | | | | 370/392 |
| 2015/0063353 | A1 | 3/2015 | Kapadia et al. | |
| 2015/0188728 | A1 | 7/2015 | Byun | |
| 2015/0281075 | A1 | 10/2015 | Park et al. | |
| 2015/0381386 | A1* | 12/2015 | Sigoure | H04L 12/4641 |
| | | | | 370/392 |
| 2015/0381495 | A1* | 12/2015 | Cherian | H04L 61/2592 |
| | | | | 370/392 |
| 2016/0036697 | A1* | 2/2016 | DeCusatis | H04L 12/4641 |
| | | | | 370/392 |
| 2017/0005923 | A1* | 1/2017 | Babakian | G06F 9/45558 |
| 2017/0163569 | A1* | 6/2017 | Koganti | H04L 49/25 |

FOREIGN PATENT DOCUMENTS

| | | |
|---|---|---|
| CN | 103200069 A | 7/2013 |
| CN | 103957160 A | 7/2014 |
| CN | 104115453 A | 10/2014 |
| CN | 104243318 A | 12/2014 |
| CN | 104350714 A | 2/2015 |
| CN | 104601427 A | 5/2015 |
| CN | 104954218 A | 9/2015 |
| CN | 105359465 A | 2/2016 |
| CN | 105471693 A | 4/2016 |
| JP | 2014207504 A | 10/2014 |
| JP | 2015128295 A | 7/2015 |
| KR | 20150023620 A | 3/2015 |
| KR | 20150040242 A | 4/2015 |

OTHER PUBLICATIONS

Japanese Patent Office, Office Action Issued in Application No. 2018-556314, dated Aug. 20, 2019, 5 pages. (Submitted with Machine Translation).
European Patent Office, Office Action Issued in Application No. 17788811.2, dated Dec. 16, 2019, Germany, 6 pages.
ISA State Intellectual Property Office of the People's Republic of China, International Search Report Issued in Application No. PCT/CN2017/082369, dated Aug. 2, 2017, WIPO, 4 pages.
ISA State Intellectual Property Office of the People's Republic of China, Written Opinion of the International Searching Authority Issued in Application No. PCT/CN2017/082369, dated Aug. 2, 2017, WIPO, 4 pages.
European Patent Office, Extended European Search Report Issued in Application No. 17788811.2, dated Feb. 18, 2019, Germany, 11 pages.
Jia, S., Certified Translation of Priority Application No. 201610285556.9, Filed Apr. 29, 2016, Translation Generated Feb. 2, 2021, 27 pages.

* cited by examiner

PACKET TRANSMISSION

CROSS REFERENCE TO RELATED APPLICATIONS

This present application is a U.S. National Phase of International Patent Application Serial No. PCT/CN2017/082369 entitled "PACKET TRANSMISSION," filed on Apr. 28, 2017. International Patent Application Serial No. PCT/CN2017/082369 claims priority to Chinese Patent Application No. 201610285556.9 filed on Apr. 29, 2016. The entire contents of each of the above-cited applications are hereby incorporated by reference in their entirety for all purposes.

BACKGROUND

Communication process between virtual machines in a virtual extensible local area network (VXLAN) may be as follows. A source virtual machine sends packets to a VXLAN tunnel end point (VTEP) accessed by the source virtual machine, the VTEP forwards the packets to another VTEP accessed by a destination virtual machine, and the other VTEP forwards the packets to the destination virtual machine. In order to ensure communication between different virtual machines, a VXLAN tunnel may be established between each two VTEPs. In a large cloud computing scenario, as a number N of VTEPs increases, a number of VXLAN tunnels to be established exponentially increases by $N^2$, which takes up a lot of resources to establish and maintain these VXLAN tunnels.

DETAILED DESCRIPTION OF THE EMBODIMENTS

Figure 1:
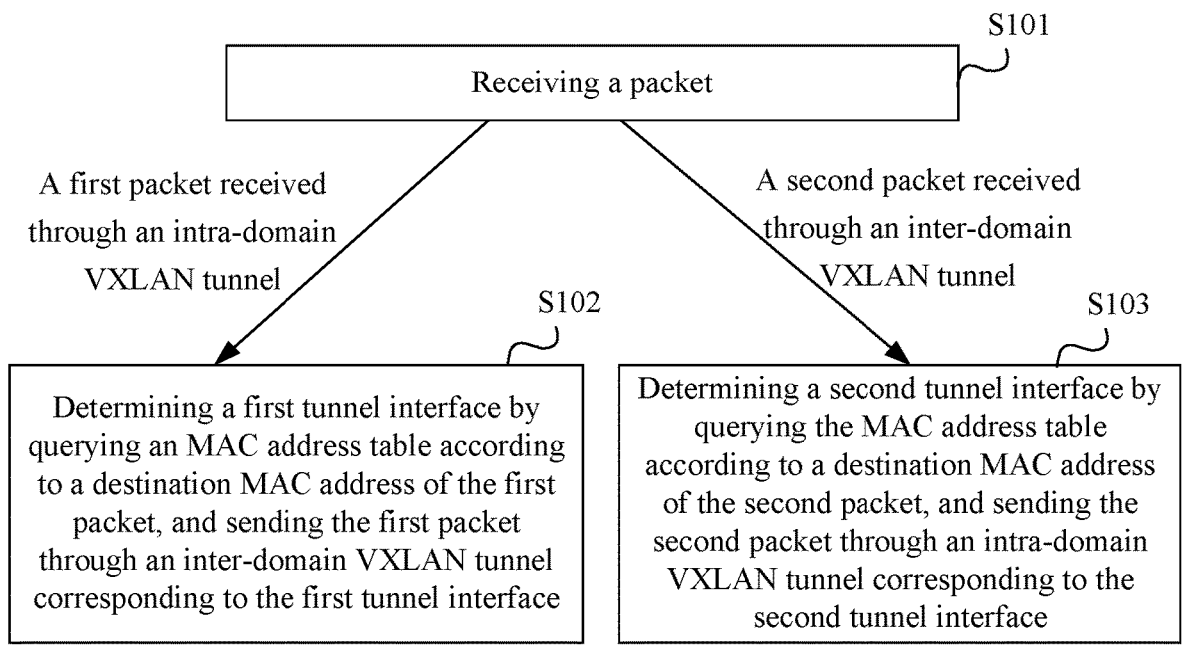
FIG. 1 schematically illustrates a flow diagram of a method of transmitting packet provided by an example of the present disclosure.
Figure 2:
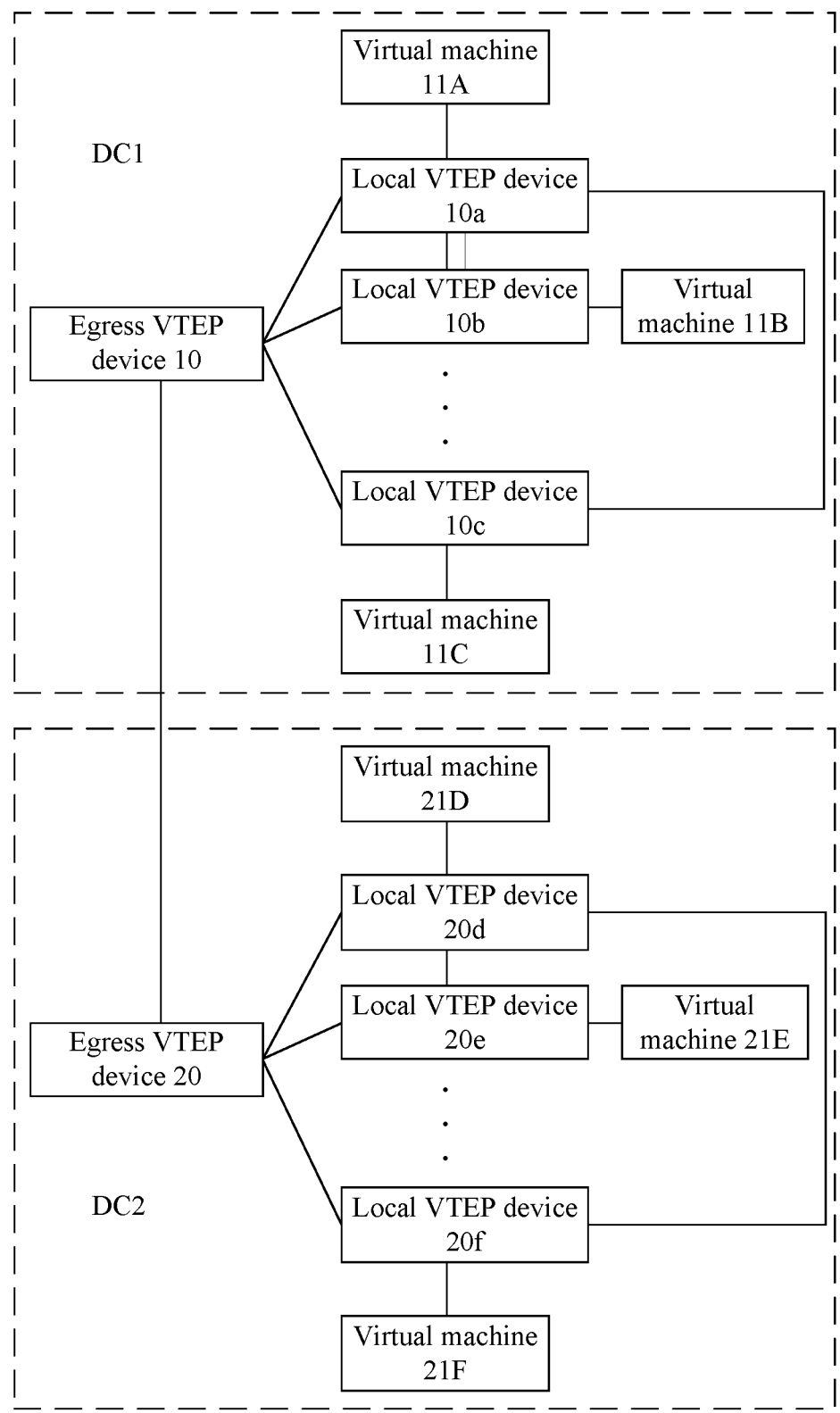
FIG. 2 is a structural diagram schematically illustrating multiple data centers provided by an example of the present disclosure.

A clear and complete description of technical solutions in examples of the present disclosure will be given below in combination with the drawings in the examples of the present disclosure. Refer to FIG. 1, which schematically illustrates a flow diagram of a method of transmitting packet provided by an example of the present disclosure. The method may be applied to an egress VTEP device in a domain. In an example of the present disclosure, a network may be divided into multiple domains, and each of the domains includes an egress VTEP device and at least one local VTEP device. An intra-domain VXLAN tunnel may be established between an egress VTEP device and each local VTEP device in a domain, and an inter-domain VXLAN tunnel may be established between every two egress VTEP devices in different domains. The above-mentioned domain may be understood as, for example, a data center. FIG. 2 is a structural diagram schematically illustrating multiple data centers provided by an example of the present disclosure.

As shown in FIG. 2, a data center DC1 includes an egress VTEP device 10 and a plurality of local VTEP devices such as a local VTEP device 10a, a local VTEP device 10b, a local VTEP device 10c. Each of the local VTEP devices establishes a VXLAN tunnel with the egress VTEP device 10. The data center DC1 further includes a plurality of virtual machines such as a virtual machine 11A accessing the local VTEP device 10a, a virtual machine 11B accessing the local VTEP device 10b, and a virtual machine 11C accessing the local VTEP device 10c. The data center DC2 includes an egress VTEP device 20 and a plurality of local VTEP devices such as a local VTEP device 20d, a local VTEP device 20e, a local VTEP device 20f or the like. Each of the local VTEP devices establishes a VXLAN tunnel with the egress VTEP device 20. The data center DC2 further includes a plurality of virtual machines such as a virtual machine 21D accessing the local VTEP device 20d, a virtual machine 21E accessing the local VTEP device 20e, and a virtual machine 21F accessing the local VTEP device 20f.

The method of transmitting packet disclosed in the example as shown in FIG. 1 may include the following blocks.

In block S101, an egress VTEP device receives a packet.

When the packet received by the egress VTEP device is a first packet sent by a local VTEP device through an intra-domain VXLAN tunnel, block S102 is executed. When the packet received by the egress VTEP device is a second packet sent by an egress VTEP device on an opposite end through an inter-domain VXLAN tunnel, block S103 is executed.

It should be noted that the first packet and the second packet herein are unicast packets.

In block S102, the egress VTEP device determines a first tunnel interface by querying an MAC address table according to a destination MAC address of the first packet, and sends the first packet through an inter-domain VXLAN tunnel corresponding to the first tunnel interface.

The first packet carries the destination MAC address and a VXLAN identifier. The egress VTEP device identifies a virtual exchange instance (VSI) to which the first packet belongs according to the VXLAN identifier when receiving the first packet, then queries the MAC address table of the VSI according to the destination MAC address to acquire the first tunnel interface corresponding to the destination MAC address, and sends the first packet to an egress VTEP device on an opposite end through the inter-domain VXLAN tunnel corresponding to the first tunnel interface. In an example of the present disclosure, egress VTEP devices at both ends of a VXLAN tunnel may be peer-to-peer egress VTEP devices mutually.

When determining by the query that the VXLAN tunnel corresponding to the first tunnel interface is an intra-domain VXLAN tunnel, the egress VTEP device discards the first packet. That is, an egress VTEP device does not forward a packet received from one local VTEP device to another local VTEP device.

In block S103, the egress VTEP device determines a second tunnel interface by querying the MAC address table according to the destination MAC address of the second packet, and send the second packet through an intra-domain VXLAN tunnel corresponding to the second tunnel interface.

The second packet carries the destination MAC address and the VXLAN identifier. The egress VTEP device identifies the VSI to which the second packet belongs according to the VXLAN identifier when receiving the second packet, then queries the MAC address table of the VSI according to the destination MAC address to acquire the second tunnel interface corresponding to the destination MAC address, and sends the second packet to a local VTEP device through an intra-domain VXLAN tunnel corresponding to the second tunnel interface.

When determining by the query that the VXLAN tunnel corresponding to the second tunnel interface is an inter-domain VXLAN tunnel, the egress VTEP device discards the second packet. That is, an egress VTEP device does not forward a packet received from an egress VTEP device on an opposite end to another egress VTEP device.

The technical solution in an example of the present disclosure will be described below more clearly.

In order to ensure communication between virtual machines, in construction of a network, egress VTEP devices and local VTEP devices each may learn MAC addresses of all virtual machines in the network by a flooding process.

When the flooding process is performed, an egress VTEP device may forward through an inter-domain VXLAN tunnel rather than other intra-domain VXLAN tunnels a broadcast packet or an unknown unicast packet received through an intra-domain VXLAN tunnel; and may forward through an intra-domain VXLAN tunnel rather than other inter-domain VXLAN tunnels a broadcast packet or an unknown unicast packet received through an inter-domain VXLAN tunnel. When a local VTEP device receives a broadcast packet or an unknown unicast packet from another local VTEP device in a data center, it does not forward the packet to other local VTEP devices in the same domain.

Figure 4:
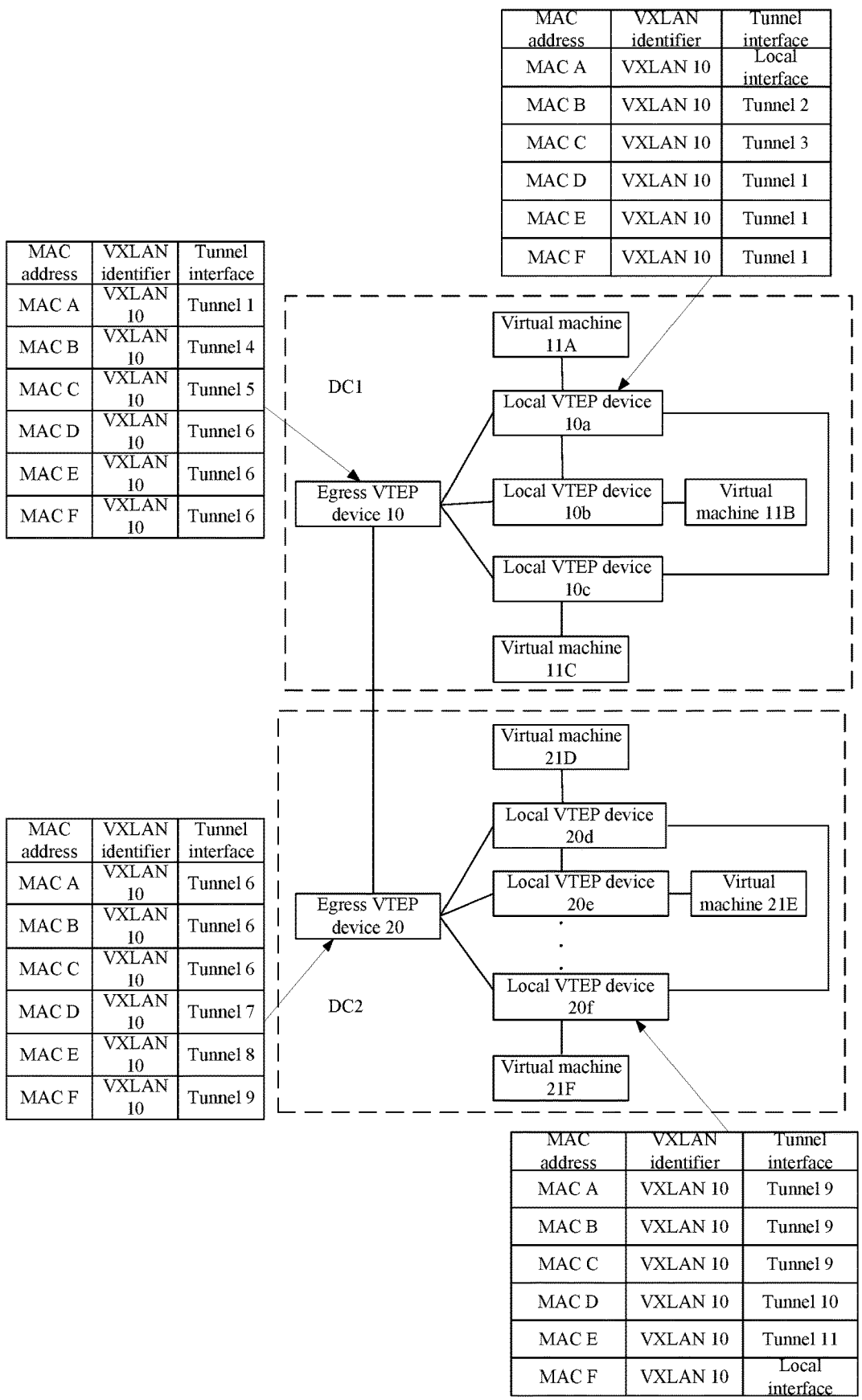
FIG. 4 exemplarily illustrates an MAC address table provided by an example of the present disclosure.

After the MAC addresses of all virtual machines in the network are learned by the flooding process, MAC address tables corresponding to the learned MAC addresses may be stored in each of the egress or local VTEP devices. FIG. 4 exemplarily illustrates MAC address tables generated by the local VTEP device 10a, the local VTEP device 20f, the egress VTEP device 10 and the egress VTEP device 20 in FIG. 2, the MAC address tables storing a corresponding relationship among MAC address, VXLAN identifier and tunnel interface (being equivalent to an egress interface). A MAC address table is not limited to the form as shown in FIG. 4, and other forms may also be adopted.

Figure 3:
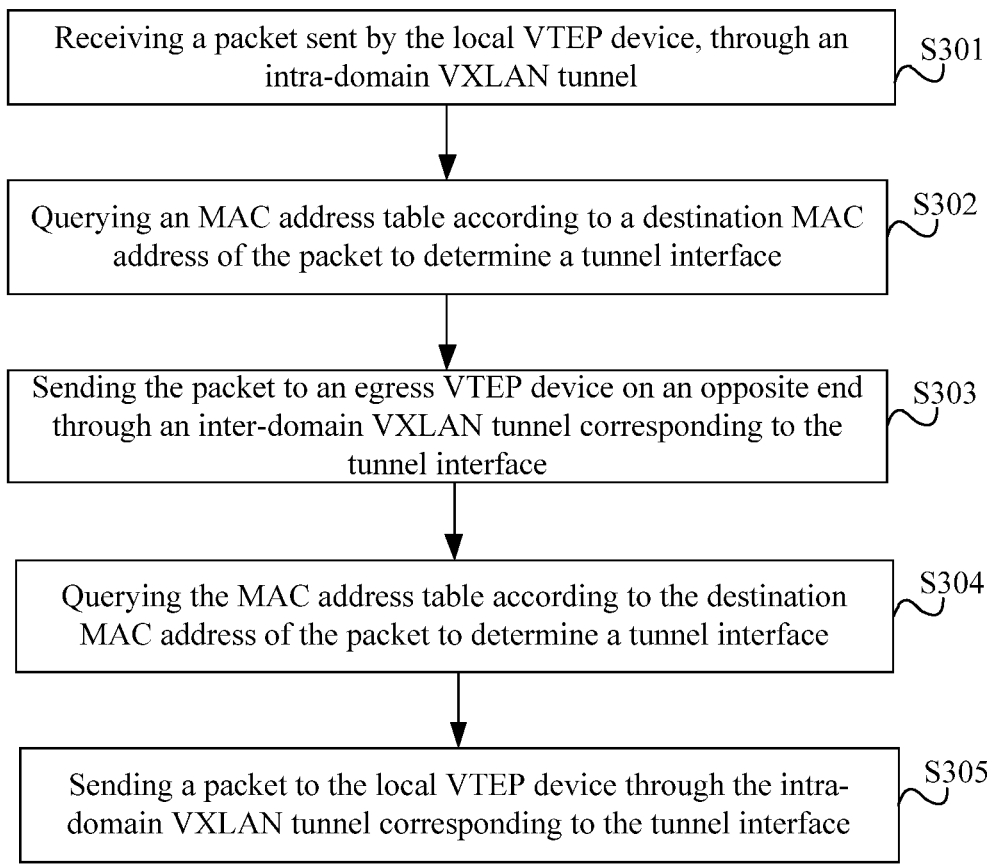
FIG. 3 schematically illustrates a flow diagram of another method of transmitting packet provided by an example of the present disclosure.

FIG. 3 schematically illustrates a flow diagram of another method of transmitting packet provided by an example of the present disclosure, and the method of transmitting packet includes the following blocks.

In block S301, an egress VTEP device receives a packet sent by a local VTEP device through an intra-domain VXLAN tunnel.

For example, after receiving a packet sent by a virtual machine, a local VTEP device may identify a VXLAN to which the packet belongs, determine an egress interface by querying an MAC address table according to a destination MAC address of the packet and the VXLAN to which the packet belongs and send the packet from the determined egress interface. According to the destination MAC address of the packet, the packet may be sent to other local VTEP devices and may also be sent to an egress VTEP device.

Refer to a schematic diagram of a networking structure of multiple data centers illustrated in FIG. 4.

If a packet is to be sent from a virtual machine 11A to a virtual machine 11B, the virtual machine 11A may send the packet to a local VTEP device 10a accessed by the virtual machine 11A, wherein a destination MAC address of the packet is a MAC address (MAC B) of the virtual machine 11B. The local VTEP device 10a identifies a VXLAN to which the packet belongs as VXLAN10, and queries a MAC address table according to the MAC B and the VXLAN10 to acquire a corresponding egress interface as Tunnel2. Then the local VTEP device 10a forwards the packet to the local VTEP device 10b through an intra-domain VXLAN tunnel corresponding to the Tunnel2.

If a packet is to be sent from the virtual machine 11A to a virtual machine 21F, the virtual machine 11A may send the packet to the local VTEP device 10a accessed by the virtual machine 11A, wherein a destination MAC address of the packet is an MAC address (MAC F) of the virtual machine 21F. The local VTEP device 10a identifies a VXLAN to which the packet belongs as VXLAN10, and queries the MAC address table according to the MAC F and the VXLAN10 to acquire a corresponding egress interface as Tunnel1. The local VTEP device 10a forwards the packet to an egress VTEP device 10 through an intra-domain VXLAN tunnel corresponding to the Tunnel1. The packet herein is equivalent to the first packet in the exemplary flow illustrated in FIG. 1.

In block S302, the egress VTEP device queries an MAC address table according to a destination MAC address of the packet to determine a tunnel interface.

The tunnel interface herein is equivalent to the first tunnel interface in the exemplary flow illustrated in FIG. 1.

The above-mentioned packet received by the egress VTEP device carries a VXLAN identifier and the destination MAC address, and the corresponding egress interface may be determined by querying the MAC address table according to the VXLAN identifier and the destination MAC address.

If the determined egress interface is a tunnel interface of an inter-domain VXLAN tunnel, block S303 is executed.

If the determined egress interface is a tunnel interface of an intra-domain VXLAN tunnel, the received packet is discarded.

In an example, an egress VTEP device may record the type of a tunnel interface such as "intra-domain" and "inter-domain" in an MAC address table, so as to identify a VXLAN tunnel corresponding to the tunnel interface as an intra-domain VXLAN tunnel or inter-domain VXLAN tunnel.

Refer to the schematic diagram of the networking structure of multiple data centers illustrated in FIG. 4. When the egress VTEP device 10 receives a packet from the local VTEP device 10a, if the destination MAC address of the packet is assumed as the MAC F, then the tunnel interface corresponding to MAC F is acquired as Tunnel 6 by querying the MAC address table. The Tunnel 6 corresponds to an inter-domain VXLAN tunnel, then block S303 is executed, namely the packet is sent through the inter-domain VXLAN tunnel corresponding to the Tunnel 6. If the destination MAC address of the packet is assumed as the MAC B, then the tunnel interface corresponding to MAC B is acquired as Tunnel 4 by querying the MAC address table. The Tunnel 4 corresponds to an intra-domain VXLAN tunnel, then the packet is discarded.

In block S303, the egress VTEP device sends the packet to an egress VTEP device on an opposite end through an inter-domain VXLAN tunnel corresponding to the tunnel interface.

Refer to the schematic diagram of the networking structure of multiple data centers illustrated in FIG. 4. Assuming that the egress interface acquired by the egress VTEP device 10 is the Tunnel 6, the packet may be sent to the egress VTEP device 20 through the inter-domain VXLAN tunnel corresponding to the Tunnel 6.

In block S304, the egress VTEP device on the opposite end queries the MAC address table according to the destination MAC address of the packet to determine a tunnel interface.

Herein, the packet received by the egress VTEP device on the opposite end is equivalent to the second packet in the exemplary flow illustrated in FIG. 1, and correspondingly, the tunnel interface determined herein is equivalent to the second tunnel interface in the exemplary flow illustrated in FIG. 1.

Herein, the packet received by the egress VTEP device on the opposite end through the inter-domain VXLAN tunnel carries the VXLAN identifier and the destination MAC address, and the egress interface may be determined by querying the MAC address table according to the VXLAN identifier and the destination MAC address.

If the determined egress interface is a tunnel interface of an inter-domain VXLAN tunnel, the received packet is discarded to avoid the formation of a loop.

If the determined egress interface is a tunnel interface of an intra-domain VXLAN tunnel, block S305 is executed.

Refer to the schematic diagram of the networking structure of multiple data centers illustrated in FIG. 4. When the egress VTEP device 20 receives a packet from the egress VTEP device 10, if the destination MAC address of the packet is assumed as the MAC F, then a tunnel interface corresponding to the MAC F is acquired as Tunnel 9 by querying the MAC address table. The Tunnel 9 corresponds to an intra-domain VXLAN tunnel, then block S305 is executed. If the destination MAC address of the packet is assumed as the MAC B, then a tunnel interface corresponding to the MAC B is acquired as Tunnel 6 by querying the MAC address table. The Tunnel 6 corresponds to an inter-domain VXLAN tunnel, and then the packet is discarded.

In block S305, the egress VTEP device on the opposite end sends a packet to the local VTEP device through the intra-domain VXLAN tunnel corresponding to the tunnel interface.

Refer to the schematic diagram of the networking structure of multiple data centers illustrated in FIG. 4. Assuming that the egress interface acquired by the egress VTEP device 20 is the Tunnel 9, the packet may be sent to the local VTEP device 20f through the inter-domain VXLAN tunnel corresponding to the Tunnel 9. The local VTEP device 20f may send the packet to the virtual machine 21F through a local interface according to the destination MAC address MAC F after receiving the packet.

Herein, after receiving the packet, the local VTEP device does not forward the packet to other local VTEP devices in the data center, and thus the formation of the loop may be avoided.

In an example of the present disclosure, in order to ensure that different data centers and virtual machines between different VXLANs may perform communication, an egress VTEP device may establish a mapping relationship between different VXLANs in advance, for example, an inter-domain VXLAN identifier mapping relationship. In the flow illustrated in FIG. 1, the egress VTEP device may query the inter-domain VXLAN identifier mapping relationship according to a first VXLAN identifier carried in the first packet to acquire a corresponding second VXLAN identifier, replace the first VXLAN identifier carried in the first packet with the second VXLAN identifier, and forward the modified first packet to the egress VTEP device on an opposite end through an inter-domain VXLAN tunnel.

Therefore, VXLANs of different data centers may be separately planned. In case of a change (e.g., a change of a VXLAN identifier corresponding to a virtual machine) of information of a virtual machine in a certain data center, VXLAN identifiers in MAC address tables stored in all local VTEP devices and egress VTEP devices and inter-domain VXLAN identifier mapping relationship stored in all egress VTEP devices in the data center to which the virtual machine belongs may be updated, and MAC address tables stored in local VTEP devices and egress VTEP devices in other data centers do not need to be updated, so as to maintain and manage VTEPs more conveniently.

In an example of the present disclosure, for one VXLAN, multiple groups of VXLAN identifier mapping relationships corresponding to the VXLAN may be stored in an egress VTEP device, that is, the VXLAN may correspond to a plurality of other VXLANs. After receiving a first packet, the egress VTEP device may acquire a plurality of corresponding second VXLAN identifiers according to a first VXLAN identifier carried in the first packet. In order to accurately determine a second VXLAN identifier from the plurality of second VXLAN identifiers, a mapping relationship between VXLAN identifiers and MAC addresses or a mapping relationship between VXLAN identifiers and tunnel interfaces may also be stored in the egress VTEP device, and a corresponding VXLAN identifier may be acquired by querying the mapping relationship between VXLAN identifiers and MAC addresses according to a destination MAC address carried in the first packet; or a corresponding VXLAN identifier may be acquired by querying the mapping relationship between VXLAN identifiers and tunnel interfaces according to the first tunnel interface; and if the plurality of second VXLAN identifiers include the acquired VXLAN identifier, the acquired VXLAN identifier is the correct second VXLAN identifier, and thus the first packet may be prevented from being sent to a non-destination virtual machine.

Assuming that a network includes 3 data centers, which are respectively DC1, DC2 and DC3, VXLAN identifiers corresponding to each data center are respectively {DC1, VXLAN1}, {DC2, VXLAN2} and {DC3, VXLAN3}, and an inter-domain VXLAN identifier mapping relationships stored in an egress VTEP device of each data center are respectively:

DC 1: {(VXLAN1, VXLAN2),(VXLAN1, VXLAN3)};
DC2: {(VXLAN2, VXLAN1),(VXLAN2, VXLAN3)};
DC3: {(VXLAN3, VXLAN1),(VXLAN3, VXLAN2)};

After receiving a packet to be sent to a virtual machine in the DC2, an egress VTEP device X1 in the DC1 may acquire the second VXLAN identifiers as VXLAN2 and VXLAN3 according to the VXLAN identifier mapping relationship {(VXLAN1, VXLAN2), (VXLAN1, VXLAN3)} stored in the egress VTEP device X1.

At this time, if the mapping relationship between VXLAN identifiers and MAC addresses stored in the egress VTEP device X1 is: {(VXLAN2, Y1),(VXLAN3, Y2)}, in the case that a destination MAC address of the received packet is known as Y1, the VXLAN identifier corresponding to the destination MAC address Y1 may be acquired as VXLAN2 according to the mapping relationship between VXLAN identifiers and MAC addresses; and in combination with the acquired second VXLAN identifiers VXLAN2 and VXLAN3, it may be determined that the first VXLAN identifier carried in the received packet needs to be replaced with the VXLAN2.

If the mapping relationship between VXLAN identifiers and tunnel interfaces stored in the egress VTEP device X1 is: {(VXLAN2, Z1),(VXLAN3, Z2)}, when a first tunnel interface Z1 is acquired according to a destination MAC address of the received packet, a VXLAN identifier corresponding to the first tunnel interface Z1 may be acquired as the VXLAN2 according to the mapping relationship between VXLAN identifiers and tunnel interfaces. In combination with the acquired second VXLAN identifiers VXLAN2 and VXLAN3, it may be determined that the first VXLAN identifier carried in the received packet needs to be replaced with the VXLAN2.

According to the method in examples of the present disclosure, communication between two data centers may be ensured as long as a VXLAN tunnel is established between egress VTEPs of different data centers, thereby reducing the network resources occupied by the tunnels established between the VTEP devices of different data centers.

Figure 5:
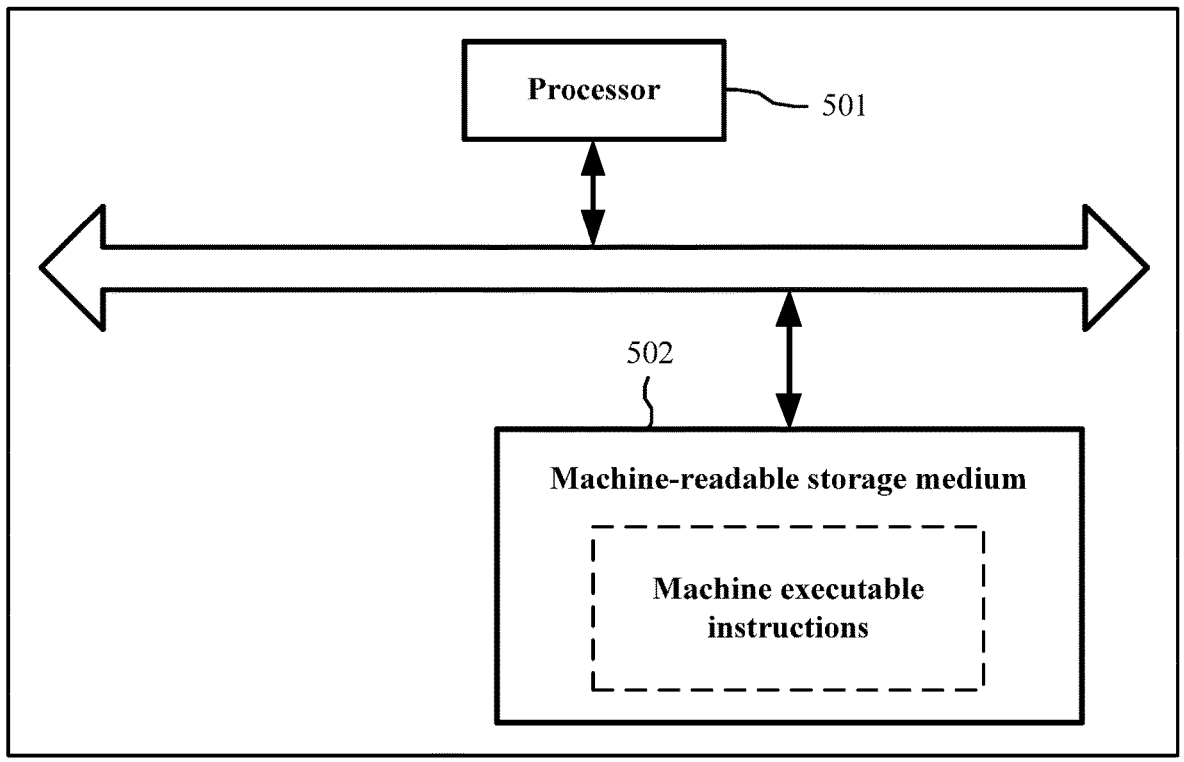
FIG. 5 schematically illustrates a hardware structure diagram of a VTEP device provided by an example of the present disclosure.

FIG. 5 schematically illustrates a hardware structure diagram of a VTEP device provided by an example of the present disclosure. The VTEP device may include a processor 501, and a machine-readable storage medium 502 storing machine executable instructions. The processor 501 may communicate with the machine-readable storage medium 502, and execute the method of transmitting packet described above by reading and executing the machine readable instructions in the machine-readable storage medium 502.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof.

Figure 6:
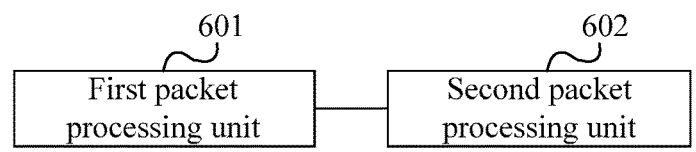
FIG. 6 schematically illustrates a structural diagram of a device for transmitting packet provided by an example of the present disclosure.

A device for transmitting packet is also disclosed in an example of the disclosure. The device for transmitting packet may be applied on the VTEP device as shown in FIG. 5. FIG. 6 shows a structural diagram of the device for transmitting packet in the example of the disclosure. The device may include a first packet processing unit 601 and a second packet processing unit 602 as shown in FIG. 6.

The first packet processing unit 601 may receive a first packet from a local VTEP device through an intra-domain VXLAN tunnel, determine a first tunnel interface by querying an MAC address table according to a destination MAC address of the first packet, and send the first packet through an inter-domain VXLAN tunnel corresponding to the first tunnel interface, wherein the egress VTEP device and the local VTEP device belongs to a same domain, and the intra-domain VXLAN tunnel is a VXLAN tunnel established between the egress VTEP device and the local VTEP device.

The second packet processing unit 602 may receive a second packet from an egress VTEP device on an opposite end through an inter-domain VXLAN tunnel, acquire a second tunnel interface by querying the MAC address table according to a destination MAC address of the second packet, and send the second packet through an intra-domain VXLAN tunnel corresponding to the second tunnel interface, wherein the egress VTEP device and the egress device on the opposite end belongs to different domains, and the inter-domain VXLAN tunnel is a VXLAN tunnel established between the egress VTEP device and the egress device on the opposite end.

In an example of the present disclosure, if the VXLAN tunnel corresponding to the first tunnel interface is an intra-domain VXLAN tunnel, the first packet processing unit 601 discards the first packet.

In an example of the present disclosure, if the VXLAN tunnel corresponding to the second tunnel interface is an inter-domain VXLAN tunnel, the second packet processing unit 602 discards the second packet.

In an example of the present disclosure, if the first packet processing unit 601 receives a broadcast packet or an unknown unicast packet through an intra-domain VXLAN tunnel, it forwards the broadcast packet or unknown unicast packet through an inter-domain VXLAN tunnel; and if the second packet processing unit 602 receives the broadcast packet or the unknown unicast packet through an inter-domain VXLAN tunnel, it forwards the broadcast packet or the unknown unicast packet through an intra-domain VXLAN tunnel.

In an example of the present disclosure, the first packet processing unit 601 may include:

a packet receiving subunit to receive the first packet from the local VTEP device through the intra-domain VXLAN tunnel;

an interface acquiring subunit to determine the first tunnel interface by querying the MAC address table according to the destination MAC address of the first packet;

an identifier acquiring subunit to store an inter-domain VXLAN identifier mapping relationship and acquire a second VXLAN identifier by querying the pre-stored inter-domain VXLAN identifier mapping relationship according to the first VXLAN identifier carried in the first packet; and a packet sending subunit to send the first packet carrying the second VXLAN identifier through the inter-domain VXLAN tunnel corresponding to the first tunnel interface after the first VXLAN identifier carried in the first packet is replaced with the second VXLAN identifier.

In an example of the present disclosure, when acquiring the second VXLAN identifier by querying the pre-stored inter-domain VXLAN identifier mapping relationship according to the first VXLAN identifier carried in the first packet, the identifier acquiring subunit is further configured to:

in case that a plurality of second VXLAN identifiers are acquired, select a second VXLAN identifier from the plurality of second VXLAN identifiers, including:

acquire a VXLAN identifier by querying a pre-stored mapping relationship between VXLAN identifiers and MAC addresses according to the destination MAC address of the first packet; or acquire the VXLAN identifier by querying a pre-stored mapping relationship between VXLAN identifiers and tunnel interfaces according to the first tunnel interface; and determine the acquired VXLAN identifier as a second VXLAN identifier to be selected when the plurality of second VXLAN identifiers contain the acquired VXLAN identifier.

In the application of the example as shown in FIG. 5, one data center may include one egress VTEP device and at least one local VTEP device. An intra-domain VXLAN tunnel may be established between the egress VTEP device and the local VTEP device, and an inter-domain VXLAN tunnel may be established between the egress VTEP device and egress VTEP devices in other data centers. The egress VTEP device may receive a first packet from the local VTEP device through an intra-domain VXLAN tunnel and determine a first tunnel interface by querying the MAC address table according to a destination MAC address of the first packet. The egress VTEP device may send the first packet to an egress VTEP device on an opposite end through an inter-domain VXLAN tunnel corresponding to the first tunnel interface. In addition, the egress VTEP device may receive a second packet from an egress VTEP device on an opposite end, through an inter-domain VXLAN tunnel and determine a second tunnel interface by querying the MAC address table according to the destination MAC address of the second packet. The egress VTEP device may send the second packet to a local VTEP device through an intra-domain VXLAN tunnel corresponding to the second tunnel interface. In this way, as long as an inter-domain VXLAN tunnel is established between egress VTEP devices, communication between devices in two data centers may be ensured, thereby reducing the network resources occupied by the tunnels established between VTEP devices of different data centers.

As apparatus examples are substantially similar to the method examples, they are described relatively simply, and for relevant aspects, reference may be made to a part of descriptions in the method examples.

It should be noted that relational terms herein such as first and second and the like are merely configured to distinguish an entity or an operation from another entity or operation without necessarily requiring or implying any such actual relationship or sequence between these entities or operations. Moreover, the term "include", "contain" or any other variant thereof is intended to encompass non-exclusive inclusion, such that processes, methods, articles or devices that include a series of elements include not only those elements but also those that are not explicitly listed, or other elements that are inherent to such processes, methods, articles or devices. In the absence of more restrictions, the elements defined by the statement "including a . . . " do not preclude the presence of additional identical elements in the processes, methods, articles or devices that include these elements.

It will be understood by those of ordinary skill in the art that all or a part of the blocks in the above-mentioned method examples may be accomplished by a program by instructing related hardware, the program may be stored in a machine-readable storage medium, and the storage medium herein may include: such as, a ROM/RAM, a disk, compact disc and so on.

The foregoing descriptions are merely examples of the present disclosure, and are not intended to limit the protection scope of the present disclosure. Any modifications, equivalent substitutions, improvements and the like made within the spirit and principle of the present disclosure are encompassed in the protection scope of the present disclosure.

The invention claimed is:

1. A method of transmitting packet, comprising:
  receiving, by an egress VXLAN tunnel end point (VTEP) device, a first packet from a local VTEP device through an intra-domain VXLAN tunnel;
  determining, by the egress VTEP device, a first tunnel interface by querying a media access control (MAC) address table according to a destination MAC address of the first packet;
  acquiring, by the egress VTEP device, a second VXLAN identifier by querying a stored inter-domain VXLAN identifier mapping relationship according to a first VXLAN identifier carried in the first packet;
  replacing, by the egress VTEP device, the first VXLAN identifier carried in the first packet with the second VXLAN identifier;
  sending, by the egress VTEP device, the first packet carrying the second VXLAN identifier through an inter-domain VXLAN tunnel corresponding to the first tunnel interface;
  receiving, by the egress VTEP device, a second packet from an egress VTEP device on an opposite end, through an inter-domain VXLAN tunnel;
  determining, by the egress VTEP device, a second tunnel interface by querying the MAC address table according to a destination MAC address of the second packet;
  sending, by the egress VTEP device, the second packet through an intra-domain VXLAN tunnel corresponding to the second tunnel interface;
  wherein the egress VTEP device and the local VTEP device belongs to a same domain, and the intra-domain VXLAN tunnel is a VXLAN tunnel established between the egress VTEP device and the local VTEP device; and the egress VTEP device and the egress device on the opposite end belongs to different domains, and the inter-domain VXLAN tunnel is a VXLAN tunnel established between the egress VTEP device and the egress device on the opposite end.

2. The method according to claim 1, further comprising:
  discarding, by the egress VTEP device, the first packet when a VXLAN tunnel corresponding to the first tunnel interface is an intra-domain VXLAN tunnel.

3. The method according to claim 1, further comprising:
  discarding, by the egress VTEP device, the second packet when a VXLAN tunnel corresponding to the second tunnel interface is an inter-domain VXLAN tunnel.

4. The method according to claim 1, further comprising:
  forwarding, by the egress VTEP device, a broadcast packet or an unknown unicast packet through an inter-domain VXLAN tunnel when the broadcast packet or the unknown unicast packet is received through an intra-domain VXLAN tunnel; and forwarding, by the egress VTEP device, a broadcast packet or an unknown unicast packet through an intra-domain VXLAN tunnel when the broadcast packet or the unknown unicast packet is received through an inter-domain VXLAN tunnel.

5. The method according to claim 1, in case that a plurality of second VXLAN identifiers are acquired by querying the inter-domain VXLAN identifier mapping relationship according to the first VXLAN identifier, the method further comprising:
  acquiring, by the egress VTEP device, a VXLAN identifier by querying a pre-stored mapping relationship between VXLAN identifier and MAC address according to the destination MAC address of the first packet or acquiring, by the egress VTEP device, the VXLAN identifier by querying a pre-stored mapping relationship between VXLAN identifier and tunnel interface according to the first tunnel interface; and determining, by the egress VTEP device, the acquired VXLAN identifier as a second VXLAN identifier to be selected when the acquired VXLAN identifier is included in the plurality of second VXLAN identifiers.

6. An egress VXLAN tunnel end point (VTEP) device, comprising:
  a processor, and a non-transitory machine-readable storage medium storing machine executable instructions, wherein, by reading and executing the machine executable instructions, the processor is caused to:

receive a first packet from a local VTEP device through an intra-domain VXLAN tunnel;

determine a first tunnel interface by querying a media access control (MAC) address table according to a destination MAC address of the first packet;

acquire a second VXLAN identifier by querying a stored inter-domain VXLAN identifier mapping relationship according to a first VXLAN identifier carried in the first packet;

replace the first VXLAN identifier carried in the first packet with the second VXLAN identifier;

send the first packet carrying the second VXLAN identifier through an inter-domain VXLAN tunnel corresponding to the first tunnel interface;

receive a second packet from an egress VTEP device on an opposite end through an inter-domain VXLAN tunnel;

determine a second tunnel interface by querying the MAC address table according to a destination MAC address of the second packet;

send the second packet through an intra-domain VXLAN tunnel corresponding to the second tunnel interface;

wherein the egress VTEP device and the local VTEP device belongs to a same domain, and the intra-domain VXLAN tunnel is a VXLAN tunnel established between the egress VTEP device and the local VTEP device; and the egress VTEP device and the egress VTEP device on the opposite end belongs to different domains, and the inter-domain VXLAN tunnel is a VXLAN tunnel established between the egress VTEP device and the egress VTEP device on the opposite end.

7. The device according to claim 6, wherein the machine executable instructions further cause the processor to:

discard the first packet when a VXLAN tunnel corresponding to the first tunnel interface is an intra-domain VXLAN tunnel.

8. The device according to claim 6, wherein the machine executable instructions further cause the processor to:

discard the second packet when a VXLAN tunnel corresponding to the second tunnel interface is an inter-domain VXLAN tunnel.

9. The device according to claim 6, wherein the machine executable instructions further cause the processor to:

forward a broadcast packet or an unknown unicast packet through an inter-domain VXLAN tunnel when the broadcast packet or the unknown unicast packet is received through an intra-domain VXLAN tunnel; and forward the broadcast packet or the unknown unicast packet through an intra-domain VXLAN tunnel when the broadcast packet or the unknown unicast packet is received through an inter-domain VXLAN tunnel.

10. The device according to claim 6, wherein in case that a plurality of second VXLAN identifiers are acquired by querying the inter-domain VXLAN identifier mapping relationship according to the first VXLAN identifier, the machine executable instructions cause the processor to:

acquire a VXLAN identifier by querying a pre-stored mapping relationship between VXLAN identifiers and MAC addresses according to the destination MAC address of the first packet; or acquire the VXLAN identifier by querying a pre-stored mapping relationship between VXLAN identifier and tunnel interface according to the first tunnel interface; and determine the acquired VXLAN identifier as a second VXLAN identifier to be selected when the acquired VXLAN identifier is included in the plurality of the second VXLAN identifiers.

* * * * *

UNITED STATES PATENT AND TRADEMARK OFFICE
CERTIFICATE OF CORRECTION

| | | |
|---|---|---|
| PATENT NO. | : 11,012,258 B2 | Page 1 of 1 |
| APPLICATION NO. | : 16/097078 | |
| DATED | : May 18, 2021 | |
| INVENTOR(S) | : Jianfeng Liu | |

It is certified that error appears in the above-identified patent and that said Letters Patent is hereby corrected as shown below:

On the Title Page

Correct the Assignee name from "New H3C Technologies Co., Lid." to "New H3C Technologies Co., Ltd."

Signed and Sealed this
Fourth Day of January, 2022

Drew Hirshfeld
*Performing the Functions and Duties of the
Under Secretary of Commerce for Intellectual Property and
Director of the United States Patent and Trademark Office*